United States Patent [19]

Nobesawa

[11] Patent Number: 5,668,799
[45] Date of Patent: Sep. 16, 1997

[54] BUS LINE TRAFFIC CONTROL ADAPTER APPARATUS

[75] Inventor: Hiroyuki Nobesawa, Tokyo, Japan

[73] Assignee: NEC Corporation, Tokyo, Japan

[21] Appl. No.: 579,430

[22] Filed: Dec. 27, 1995

[30] Foreign Application Priority Data

Dec. 28, 1994 [JP] Japan ................................. 6-328642

[51] Int. Cl.⁶ .............................. H04L 12/40; H04L 12/56
[52] U.S. Cl. ............................................. 370/230; 370/421
[58] Field of Search ............................... 370/230, 232, 370/389, 419, 420, 421, 468, 524

[56] References Cited

U.S. PATENT DOCUMENTS

| | | | |
|---|---|---|---|
| 4,922,482 | 5/1990 | Tanahashi et al. | 370/421 |
| 5,166,894 | 11/1992 | Saito | 370/418 |
| 5,268,904 | 12/1993 | Umeda | 370/421 |
| 5,357,507 | 10/1994 | Hughes et al. | 370/234 |
| 5,400,335 | 3/1995 | Yamada | 370/524 |
| 5,432,790 | 7/1995 | Hluchj et al. | 370/468 |

FOREIGN PATENT DOCUMENTS 2119340  5/1990  Japan.

*Primary Examiner*—Hassan Kizou
*Attorney, Agent, or Firm*—Sughrue, Mion, Zinn, Macpeak & Seas

[57] ABSTRACT

The invention provides a bus line traffic control adapter apparatus which can secure a communications throughput of a data terminal which is already in a communicating condition even where there is a limitation in transfer capacity on a bus line. A first packet controller extracts throughput information in call user data in a call request packet. A traffic controller subtracts a current throughput value read out from a total throughput control section from allowable throughput information on a bus line, compares a value obtained by the subtraction with the throughput information notified from the first packet controller, and permits or rejects origination of a call in accordance with a result of the comparison. When a notification of rejection of origination of a call is received, the first packet controller cancels the received call request packet then and notifies a clear indication packet to the data terminal by way of a second ISDN control section.

3 Claims, 5 Drawing Sheets

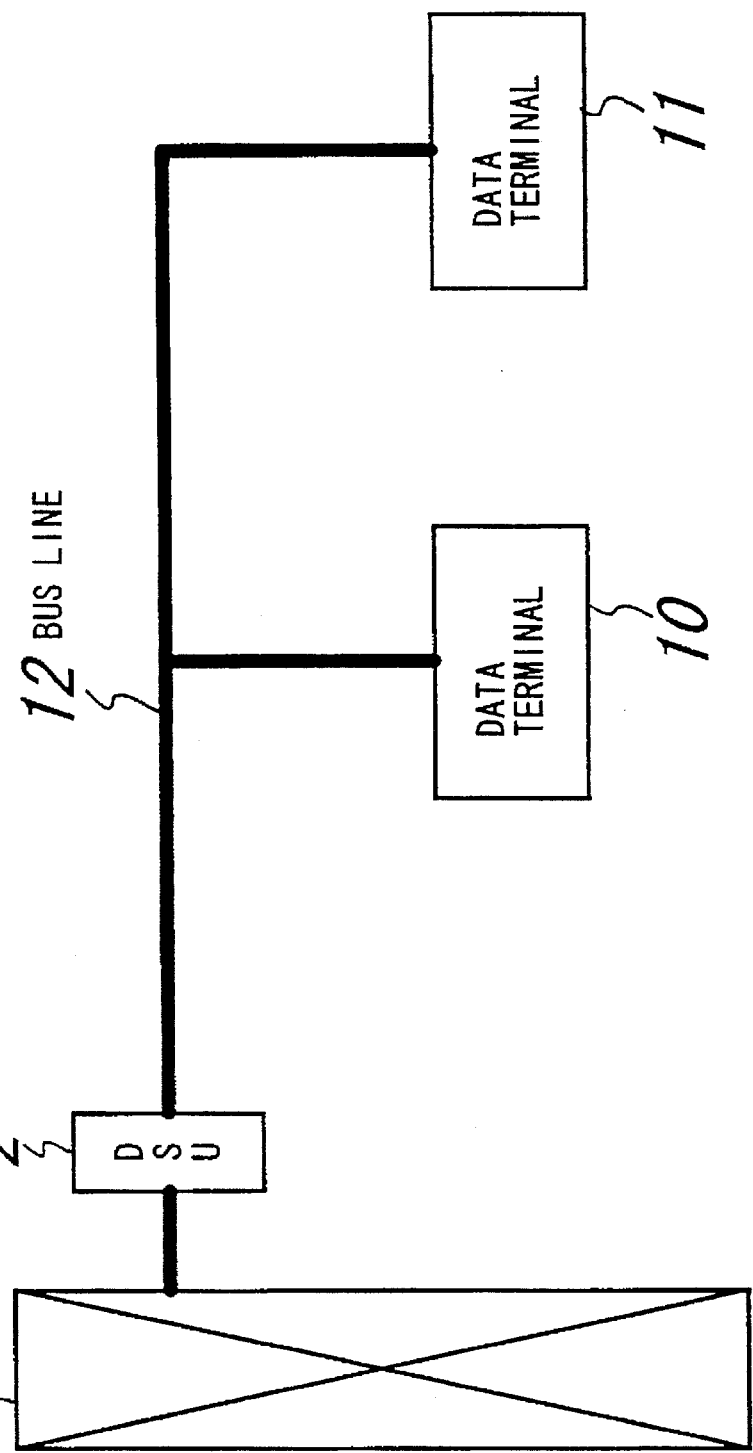

5,668,799

BUS LINE TRAFFIC CONTROL ADAPTER APPARATUS

BACKGROUND OF THE INVENTION

1. Field of the Invention

This invention relates to a bus line traffic control adapter apparatus, and more particularly to an adapter apparatus for controlling the traffic on a bus line for a terminal apparatus of an ISDN (Integrated Services Digital Network) which performs packet communications.

2. Description of the Related Art

Conventionally, traffic control in packet communications is all performed by an exchange itself in which packet terminals are accommodated, and only involves throughput control of packets in units of a logical channel. Meanwhile, on a bus line of an ISDN, only competition control of the layer 1 level is performed, and securing of the throughput after connection of a line relies upon operation of data terminals connected to the bus line as disclosed in, for example, Japanese Patent Laid-Open Application No. Heisei 2-119340.

FIG. 5 is a diagrammatic view showing a construction of a system of a conventional packet communications network of an ISDN on which traffic control is performed. Referring to FIG. 5, an ISDN exchange 1 is connected to a bus line 12 by way of a digital service unit (DSU) 2. Also a pair of data terminals 10 and 11 are shown connected to the bus line 12.

In a packet communications network of an ISDN, packet transfer is performed either using the B channel or using the D channel for signals. If it is assumed that the D channel is used to perform packet transfer in the system of FIG. 5, although the transmission capacity on the bus line 12 is controlled to 16 kbps of the D channel, there is a characteristic in that packet communications can be performed simultaneously by a plurality of data terminals such as the data terminals 10 and 11.

Now, while the first data terminal 10 performs packet communications at 10 kbps with the ISDN exchange 1, if the second data terminal 11 tries to perform packet communications at 10 kbps, since the the first data terminal 10 is using the bus line 12 at 10 kbps, the second data terminal 11 can perform packet communications only at 6 kbps on the bus line 12 of the transfer capacity of 16 kbps.

If this condition continues for a certain period of time and then the transfer rate of the packet communications of the first data terminal 10 drops to 5 kbps, then the second data terminal 11 can perform packet communications at the desired transfer rate of 10 kbps. Then, if the first data terminal 10 now tries to raise the throughput to 10 kbps after the packet communications conditions at the transfer rate of 5 kbps by the first data terminal 10 and at the transfer rate of 10 kbps by the second data terminal 11 continue for a certain period of time, then since the second data terminal 11 is communicating at the transfer rate of 10 kbps, the first data terminal 10 can perform its packet communications only at 6 kbps.

Since the conventional traffic control employs a throughput class controlling method for each logical channel in this manner, the allowable throughput on the bus line 12 is competitively shared between the data terminals, and whether or not a desired throughput can be realized depends upon the communication condition of another data terminal or terminals and a desired communications throughput is not secured. Thus, the conventional traffic control is disadvantageous in that, if the total throughput value of logical channels becomes high, a drop of the throughput occurs, which may give rise to a trouble in communications operation.

SUMMARY OF THE INVENTION

It is an object of the present invention to provide a bus line traffic control adapter apparatus which can secure the communications throughput of a data terminal which is already in a communicating condition even where there is a limitation in transfer capacity on a bus line.

In order to attain the object described above, according to the present invention, there is provided a bus line traffic control adapter apparatus interposed between a service unit and a plurality of data terminals connected to the service unit by way of a bus line, which comprises a total throughput control section for storing current total throughput information of the bus line, a first packet controller for extracting, when a call request packet transmitted from one of the plurality of data terminals and including data transmission throughput information is received by way of the bus line, the throughput information and sending out a call request packet in response to permission of origination of a call to the service unit, a second packet controller for receiving and identifying a packet inputted thereto from a network side by way of the service unit, and a traffic controller for subtracting, when the throughput information is inputted thereto from the first packet controller, the current total throughput information obtained from the total throughput control section from a transmission capacity of the bus line, comparing a value obtained by the subtraction with the throughput information inputted thereto from the first packet controller to determine whether or not the call request should be accepted, and notifying, when the call request should be accepted, permission of origination of a call to the first packet controller and changing the current total throughput information stored in the total throughput control section to a value obtained by addition of the throughput information to the current total throughput information, but cancelling, when the call request should be rejected, the received call request packet and sending to the first packet controller an instruction to send out a clear indication packet to the bus line.

In the bus line traffic control adapter apparatus, current total throughput information (traffic information) on the bus line is always stored in the total throughput control section. Thus, when a call request packet is received from an arbitrary one of the data terminals by way of the bus line, the first packet controller extracts throughput information included in the call request packet, and the traffic controller compares the thus extracted throughput information with a value obtained by subtraction of the current total throughput information obtained from the total throughput control section from a transmission capacity of the wire line. Then, the traffic controller determines it based on a result of the comparison whether or not the call request should be accepted. When it is determined that the call request should be accepted, the traffic controller notifies permission of origination of a call to the first packet controller, but when the call request should be rejected, the traffic controller cancels the call request packet and sends to the first packet controller an instruction to send out a clear indication packet to the bus line. Consequently, the data terminal can communicate at a throughput within the transmission capacity of the bus line. Then, any subsequent call request packet having throughput information with which the total throughput will exceed the transmission capacity of the bus line can be cancelled. Consequently, a line is connected without relying upon operation of any other data terminal connected to the bus line, and the communications throughput of any data terminal which is already in a communicating condition can be secured.

Preferably, the bus line traffic control adapter apparatus is constructed such that, when the traffic controller receives a notification of disconnection by an input of a clear request packet from the first packet controller or receives a notification of disconnection by an input of a clear indication packet from the second packet controller, the traffic controller changes the current total throughput information stored in the total throughput control section to a value obtained by subtraction of the throughput of the disconnected call from the stored current total throughput information. Where the bus line traffic control adapter apparatus is constructed in this manner, even if disconnection of communications occurs, the total throughput information on the bus line can always be held accurate.

Preferably, the first packet controller deletes, when a notification of permission of origination of a call is received from the traffic controller, a data portion of the call request packet received by way of the bus line which has the throughput information and transmits a resulted packet to the service unit. In this instance, transmission of unnecessary information can be eliminated advantageously.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a block diagram showing a conventional packet communications system.

DESCRIPTION OF THE PREFERRED EMBODIMENT

Figure 1:
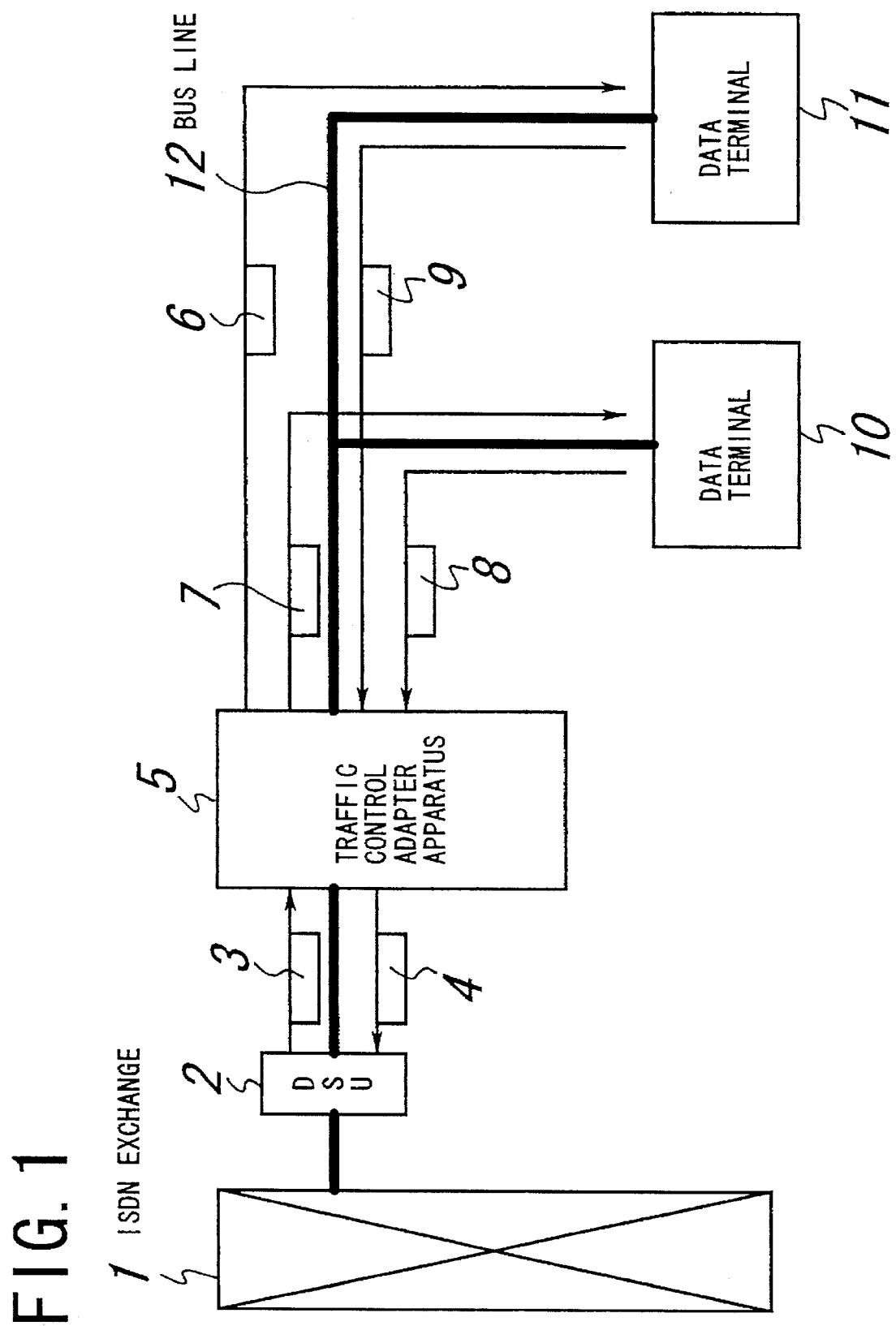
FIG. 1 is a block diagram of a packet communications system in which a traffic control adapter apparatus according to the present invention is incorporated.

Referring first to FIG. 1, there is shown a packet communications system in which a traffic control adapter apparatus according to the present invention is incorporated. The packet communications system shown is characterized in that a traffic control adapter apparatus 5 according to the present invention is provided on a bus line 12 between a digital service unit (DSU) 2 of a packet communications network of an ISDN and a plurality of data terminals 10 and 11.

Figure 2:
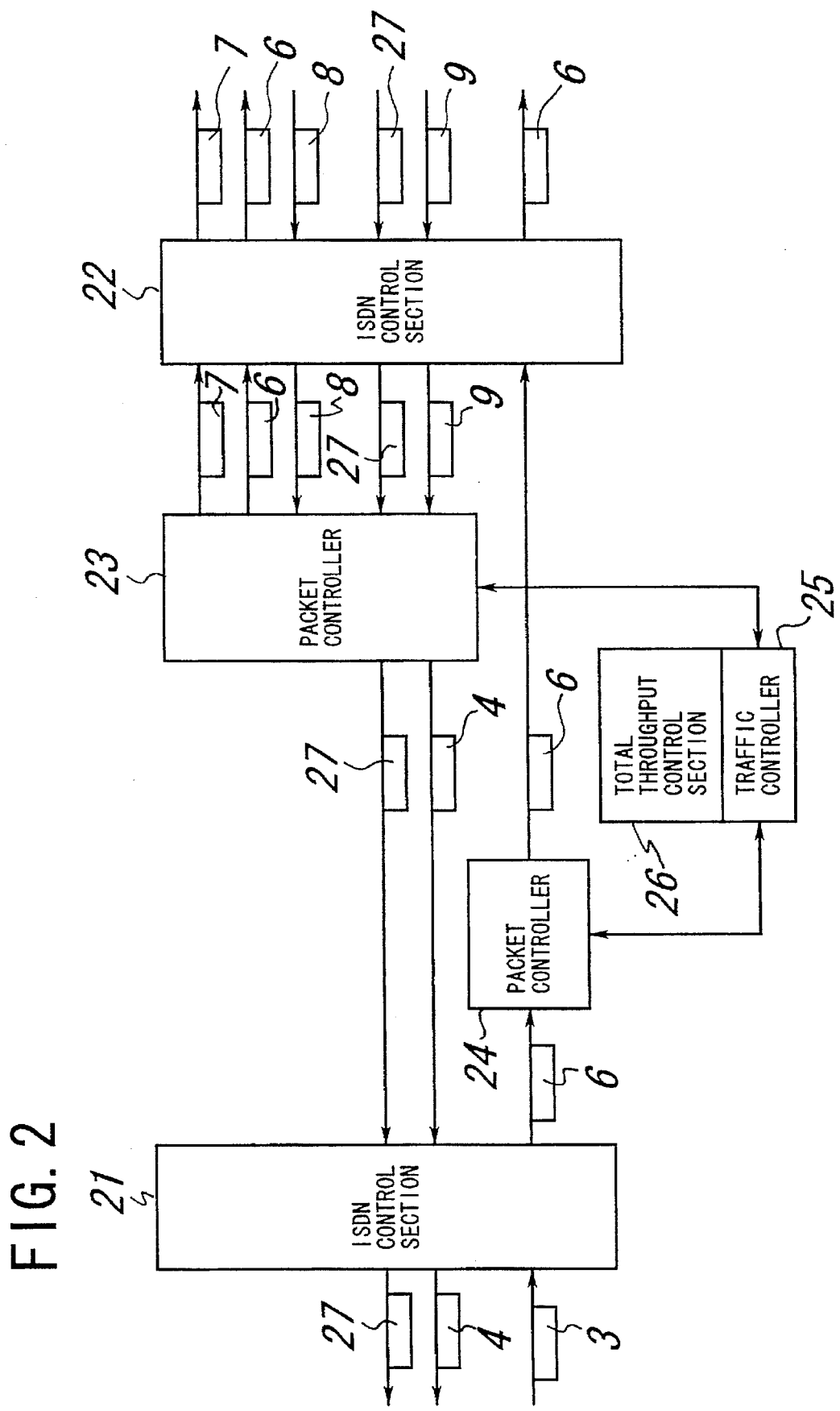
FIG. 2 is a block diagram of a traffic control adapter apparatus showing a preferred embodiment of the present invention.

A detailed construction of the traffic control adapter apparatus 5 is shown in FIG. 2. Referring to FIG. 2, the traffic control adapter apparatus 5 shown includes a first ISDN control section 21 connected to the digital service unit 2, a second ISDN control section 22 connected to the bus line 12, a first packet controller 23 to which a packet from the ISDN control section 22 is inputted, a second packet controller 24 to which a packet from the ISDN control section 21 is inputted, a traffic controller 25 for controlling the packet controllers 23 and 24, and a total throughput control section 26.

The data terminals 10 and 11 of FIG. 1 transmit and receive a packet using the D channel. A transmission frame includes, for example, a first flag bit, an address part, a control part, an information part, a frame check sequence and a second flag bit composed in a time sequence. The address part includes an identifier for identification of a type of information to be transferred (such as signal information or packet information), and another identifier for identification between the data terminals 10 and 11 connected to the bus line 12. Further, throughput information indicative of a transmission rate desired to be realized is included in call user data of the information part.

Operation of the packet communications system will be described below with reference to FIGS. 1, 2 and 3. Now, if it is assumed that the first data terminal 10 in FIG. 1 starts communications, then the data terminal 10 first sends out a call request (CR) packet 8, which includes, in its call user data, throughput information desired to be realized with the ISDN network, to the bus line 12 using the D channel of the ISDN (step 101 in FIG. 3).

Figure 3:
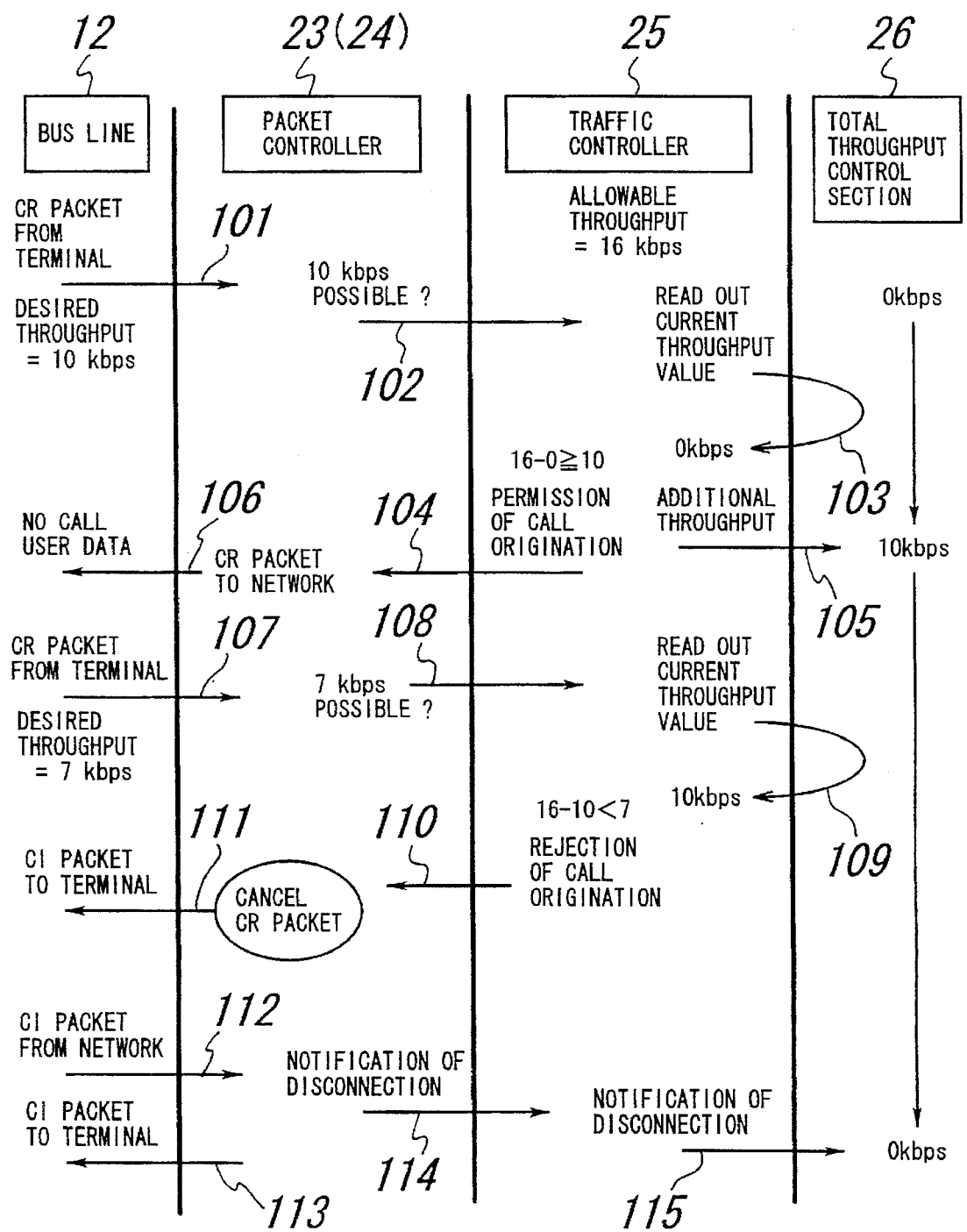
FIG. 3 is a sequence diagram illustrating operation of the adapter apparatus of FIG. 2.

The packet controller 23 of the traffic control adapter apparatus 5 shown in FIG. 2 receives and detects the call request packet 8 by way of the second ISDN control section 22, extracts the throughput information in the call user data in the call request packet 8, and inquires the traffic controller 25 for whether or not the extracted throughput information is allowable (step 102 in FIG. 3).

In response to the inquiry, the traffic controller 25 subtracts a current throughput stored in the total throughput control section 26 from the allowable throughput of the bus line 12 and compares a value obtained by the subtraction with the throughput information notified from the first packet controller 23. Then, when the former value is higher than the notified throughput information, the traffic controller 25 determines that communications are allowable and permits origination of a call from the data terminal 10 (steps 103 and 104 in FIG. 3).

Here, if it is assumed that the allowable throughput is 16 kbps while the extracted throughput information is 10 kbps and the other data terminal 11 is not currently communicating, then since the current throughput value stored in the total throughput control section 26 in this instance is 0 kbps, the traffic controller 25 notifies permission of origination of a call to the first packet controller 23 (step 104 in FIG. 3). Then, the traffic controller 25 changes the total throughput value stored in the total throughput control section 26 to a value obtained by addition of the permitted throughput value (here, 10 kbps) to the current total throughput value (step 105 in FIG. 3).

When the notification of permission of origination of a call is received, the first packet controller 23 deletes the call user data from the call request packet 8 to produce a call request (CR) packet 4 and sends out the call request packet 4 to the ISDN exchange 1 by way of the ISDN control section 21 (step 106 in FIG. 3). The reason why the call user data are deleted LSD that they are unnecessary for the other party of communications and a charge is required otherwise if they are transmitted to the ISDN network.

Then, if a call accepted (CA) packet indicating acceptance of the call is sent back from the other party terminal of the communications of the ISDN network, then the first data terminal 10 starts data transfer when it receives a call connected (CC) packet 7 from the traffic control adapter apparatus 5.

Then, when the traffic control adapter apparatus 5 receives by way of the bus line 12 from the data terminal 11 a call request (CR) packet 9 which includes, in its call user data, throughput information desired to be realized with the ISDN (here, it is assumed that the desired throughput is 7 kbps) (step 107 in FIG. 3), it extracts the throughput Information in the call user data in the call request packet 9 detected by the packet controller 23 and inquires the traffic controller 25 for whether or not the extracted throughput information is allowable (step 108 in FIG. 3).

In response to the Inquiry, the traffic controller 25 reads out the current throughput value of 10 kbps stored in the total throughput control section 26 (step 109 in FIG. 3), subtracts the current throughput value from the allowable throughput value of 16 kbps of the bus line 12 and compares a value obtained by the subtraction with the throughput information of 7 kbps notified from the first packet controller 23. Here, since the former value of 6 kbps is lower than the notified throughput information of 7 kbps, the traffic controller 25 notifies rejection of origination of a call to the first packet controller 28 (step 110 in FIG. 3).

When the notification of rejection of origination of a call is received, the packet controller 28 cancels the call request packet 9 and notifies a clear indication (CI) packet 6 to the data terminal 11 by way of the second ISDN control section 22 (step 111 in FIG. 3). Consequently, in the present system, the communications throughput of the first data terminal 10 which is in a communicating condition can be secured.

It is to be noted that, when a clear indication (CI) packet 3 from the ISDN network Is received by the traffic control adapter apparatus 5 (step 112 in FIG. 3), the packet controller 24 sends out the clear indication packet 6 inputted thereto from the ISDN control section 21 to the bus line 12 by way of the second ISDN control section 22 and notifies disconnection to the traffic controller 25 (step 114 in FIG. 3). When the notification of disconnection is received, the traffic controller 25 subtracts the throughput of the disconnected call from the total throughput value stored in the total throughput control section 26 and then stores a value obtained by the subtraction into the total throughput control section 26 (step 115 in FIG. 3). Here, if the throughput of the disconnected call is 10 kbps, then the throughput value to be stored into the total throughput control section 26 is 0 kbps.

Further, if a clear request (CQ) packet 27 is sent out to the bus line 12 from the data terminal 10 which is communicating a packet, then it is supplied to the first packet controller 23 by way of the ISDN control section 22. The packet controller 23 sends out the received clear request packet 27 to the network side by way of the ISDN control section 21 and notifies disconnection to the traffic controller 25. When the notification of disconnection is received, the traffic controller 25 subtracts the throughput of the disconnected call from the total throughput value stored in the total throughput control section 26 and stores a value obtained by the subtraction into the total throughput control section 26 as described above.

Figure 4:
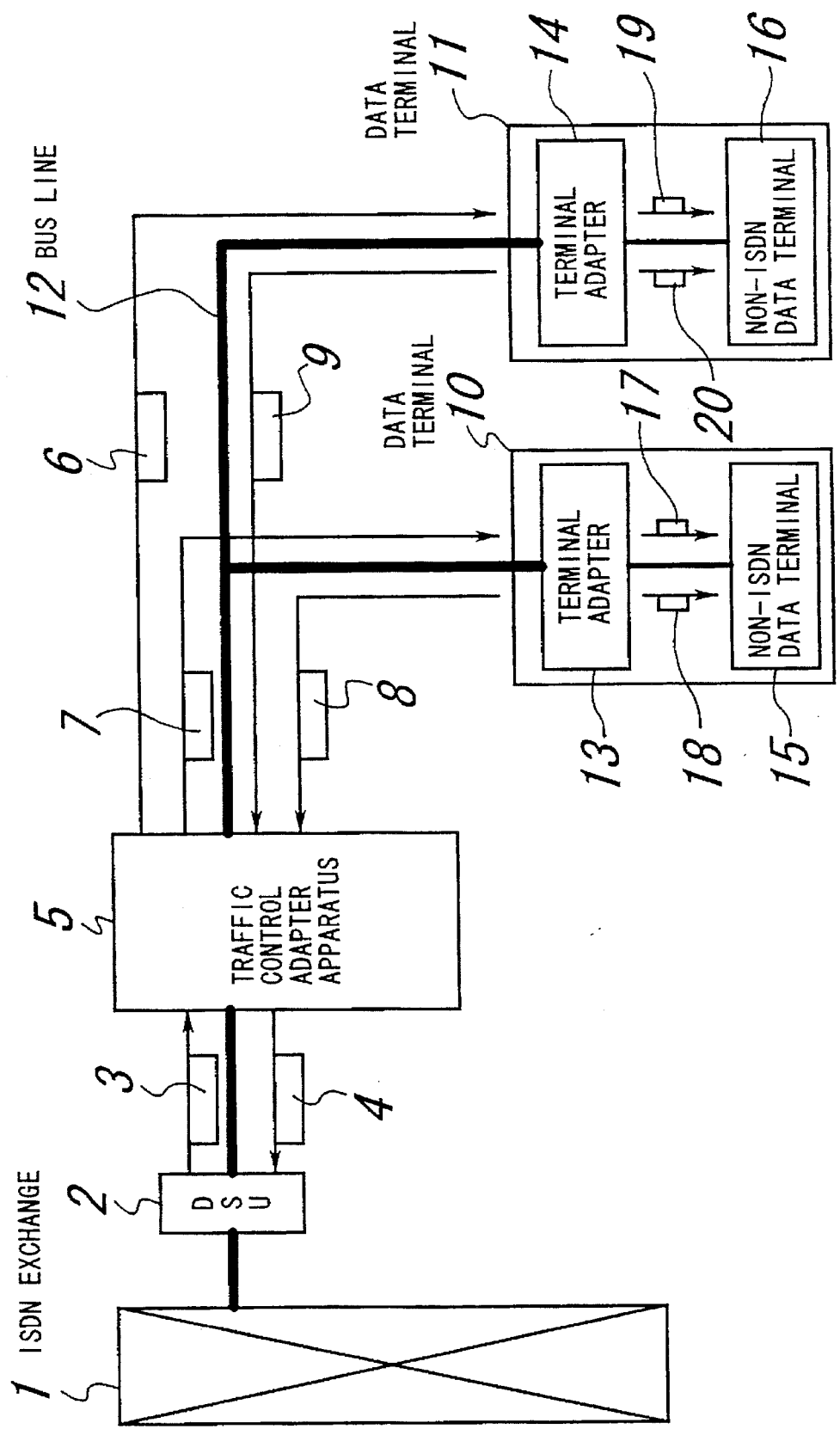
FIG. 4 is a block diagram of another packet communications system in which a traffic control adapter apparatus according to the present invention is incorporated.

FIG. 4 shows another packet communications system in which a traffic control adapter apparatus according to the present invention is incorporated. Referring to FIG. 4, the system shown is a modification to and is different from the packet communications system of FIG. 1 In that each of the data terminals 10 and 11 shown includes a terminal adapter 13 or 14 and a non-ISDN data terminal 15 or 16, respectively.

In the system shown, when the non-ISDN data terminal 15 develops a connection request 18, the terminal adapter 13 sends out a call request packet 8, which includes, in its call user data, throughput information desired to be realized with the ISDN network, to a bus line 12 using the D channel of the ISDN.

Then, in accordance with a similar sequence of operations to that described hereinabove in connection with the packet communications system of FIG. 1, the traffic control adapter apparatus 5 compares a value obtained by subtracting a current throughput value stored in the inside thereof from an allowable throughput of the bus line 12 with the throughput information, and sends out, when it permits origination of a call based on a result of the comparison, a call request packet 4 and then sends out a call connected packet 7 to the terminal adapter 13 of the first data terminal 10 by way of the bus line 12. In response to the call connected packet 7, the terminal adapter 13 supplies a call connected notification 17 to the non-ISDN data terminal 15.

Then, if a connection request 20 is thereafter notified from the non-ISDN data terminal 16, then the terminal adapter 14 converts the connection request 20 into a call request packet 9 and sends out the call request packet 9 to the traffic control adapter apparatus 5 on the bus line 12. When the traffic control adapter apparatus 5 rejects a call request by the call request packet 9, it sends out a clear indication packet 6 to the bus line 12 as described above. Upon reception of the clear indication packet 6, the terminal adapter 14 converts the clear indication packet 6 into a disconnection notification 19 and supplies the disconnection notification 19 to the non-ISDN data terminal 16. Consequently, even if the data terminal is not designed for the ISDN, the communications throughput of the first data terminal 10 which is in a communicating condition can be secured.

Having now fully described the invention, it will be apparent to one of ordinary skill in the art that many changes and modifications can be made thereto without departing from the spirit and scope of the invention as set forth herein.

What is claimed is:

1. A bus line traffic control adapter apparatus interposed between a service unit and a plurality of data terminals connected to said service unit by way of a bus line, comprising:

a total throughput control section for storing current total throughput information of said bus line;

a first packet controller for extracting, when a call request packet transmitted from one of said plurality of data terminals and including data transmission throughput information is received by way of said bus line, the throughput information and sending out a call request packet in response to permission of origination of a call to said service unit;

a second packet controller for receiving and identifying a packet inputted thereto from a network side by way of said service unit; and a traffic controller for subtracting, when the throughput information is inputted thereto from said first packet controller, the current total throughput information obtained from said total throughput control section from a transmission capacity of said bus line, comparing a value obtained by the subtraction with the throughput information inputted thereto from said first packet controller to determine whether or not the call request should be accepted, and notifying, when the call request should be accepted, permission of origination of a call to said first packet controller and changing the current total throughput information stored in said total throughput control section to a value obtained by addition of the throughput information to the current total throughput information, but cancelling, when the call request should be rejected, the received call request packet and sending to said first packet controller an instruction to send out a clear indication packet to said bus line.

2. A bus line traffic control adapter apparatus as claimed in claim 1, wherein, when said traffic controller receives a notification of disconnection by an input of a clear request packet from said first packet controller or receives a notification of disconnection by an input of a clear indication packet from said second packet controller, said traffic controller changes the current total throughput information stored in said total throughput control section to a value obtained by subtraction of the throughput of the disconnected call from the stored current total throughput information.

3. A bus line traffic control adapter apparatus as claimed in claim 1, wherein said first packet controller deletes, when a notification of permission of origination of a call is received from said traffic controller, a data portion of the call request packet received by way of said bus line which has the throughput information and transmits a resulted packet to said service unit.

* * * * *